United States Patent
Magarill et al.

(10) Patent No.: US 7,101,050 B2
(45) Date of Patent: Sep. 5, 2006

(54) ILLUMINATION SYSTEM WITH NON-RADIALLY SYMMETRICAL APERTURE

(75) Inventors: Simon Magarill, Cincinnati, OH (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 126 days.

(21) Appl. No.: 10/845,673

(22) Filed: May 14, 2004

(65) Prior Publication Data

US 2005/0254019 A1    Nov. 17, 2005

(51) Int. Cl.
G03B 21/14 (2006.01)
G03B 21/26 (2006.01)
G03B 21/00 (2006.01)
F21V 7/04 (2006.01)

(52) U.S. Cl. ............ 353/97; 353/94; 353/33; 353/34; 362/227; 362/551

(58) Field of Classification Search .......... 353/97, 353/94, 31, 33–34; 362/227, 234, 236, 551
See application file for complete search history.

(56) References Cited

U.S. PATENT DOCUMENTS

| | | | |
|---|---|---|---|
| 1,428,662 A | 9/1922 | Walter | |
| 1,451,893 A | 4/1923 | Walter | |
| 2,587,956 A | 3/1952 | Roy | |
| 3,756,688 A | 9/1973 | Hudson et al. | |
| 3,984,178 A | 10/1976 | Bergqvist | |
| 4,915,489 A | 4/1990 | Minko | |
| 5,055,892 A | 10/1991 | Gardner et al. | |
| 5,285,318 A | 2/1994 | Gleckman | |
| 5,398,086 A | 3/1995 | Nakano | |
| 5,428,365 A | 6/1995 | Harris | |
| 5,442,414 A | 8/1995 | Janssen | |
| 5,557,353 A | 9/1996 | Stahl | |
| 5,592,188 A | 1/1997 | Doherty | |
| 5,625,738 A | 4/1997 | Magarill | |
| 5,633,737 A | 5/1997 | Tanaka | |
| 5,662,401 A | 9/1997 | Shimizu | |
| 5,719,706 A | 2/1998 | Masumoto | |
| 5,757,341 A | 5/1998 | Clarke | |
| 5,764,319 A | 6/1998 | Nishihara | |

(Continued)

FOREIGN PATENT DOCUMENTS

EP    0 083 527    7/1983

(Continued)

OTHER PUBLICATIONS

U.S. Appl. No. 10/748,653, filed Dec. 30, 2003, Cannon.

(Continued)

*Primary Examiner*—W. B. Perkey
*Assistant Examiner*—Magda Cruz
(74) *Attorney, Agent, or Firm*—Anna A. Kobilansky

(57) ABSTRACT

Illumination systems are disclosed that include a light source or a bank of light sources having a non-radially symmetrical aperture having a longer dimension and a shorter dimension, such that the light source or bank of light sources produces illumination with a non-radially symmetrical angular intensity distribution having a larger angular dimension and a smaller angular dimension. The illumination systems include an integrator having an entrance end optically connected to the bank of light sources, an exit end, and a dimension that experiences a larger increase from the entrance end to the exit end. The integrator is disposed so that the dimension experiencing the larger increase is substantially aligned with the larger angular dimension of the illumination produced at the entrance end of the integrator.

36 Claims, 7 Drawing Sheets

U.S. PATENT DOCUMENTS

| | | | |
|---|---|---|---|
| 5,782,553 | A | 7/1998 | McDermott |
| 5,796,526 | A | 8/1998 | Anderson |
| 5,839,823 | A | 11/1998 | Hou |
| 5,863,125 | A | 1/1999 | Doany |
| 5,900,981 | A | 5/1999 | Oren |
| 5,900,982 | A | 5/1999 | Dolgoff et al. |
| 5,969,872 | A | 10/1999 | Oren |
| 5,971,545 | A | 10/1999 | Haitz |
| 5,987,793 | A | 11/1999 | Ebine |
| 5,997,150 | A | 12/1999 | Anderson |
| 6,028,694 | A | 2/2000 | Schmidt |
| 6,038,005 | A | 3/2000 | Handschy |
| 6,061,183 | A | 5/2000 | Nakai |
| 6,102,552 | A | 8/2000 | Tullis |
| 6,104,458 | A | 8/2000 | Fukuda |
| 6,104,541 | A | 8/2000 | Otomo |
| 6,139,156 | A | 10/2000 | Okamori et al. |
| 6,144,426 | A | 11/2000 | Yamazaki |
| 6,177,761 | B1 | 1/2001 | Pelka |
| 6,196,699 | B1 | 3/2001 | Stanton |
| 6,201,629 | B1 | 3/2001 | McClelland |
| 6,224,216 | B1 | 5/2001 | Parker |
| 6,227,669 | B1 | 5/2001 | Tiao |
| 6,236,512 | B1 | 5/2001 | Nakai |
| 6,252,636 | B1 | 6/2001 | Bartlett |
| 6,254,237 | B1 | 7/2001 | Booth |
| 6,280,058 | B1 | 8/2001 | Horigome |
| 6,318,863 | B1 | 11/2001 | Tiao |
| 6,330,039 | B1 | 12/2001 | Matsui |
| 6,332,688 | B1 | 12/2001 | Magarill |
| 6,336,724 | B1 | 1/2002 | Shouji et al. |
| 6,341,867 | B1 | 1/2002 | Itoh |
| 6,398,389 | B1 | 6/2002 | Bohler et al. |
| 6,402,347 | B1 | 6/2002 | Maas |
| 6,412,953 | B1 | 7/2002 | Tiao et al. |
| 6,419,365 | B1 | 7/2002 | Potekev et al. |
| 6,459,835 | B1 | 10/2002 | Nagaoka et al. |
| 6,469,755 | B1 | 10/2002 | Adachi |
| 6,471,358 | B1 | 10/2002 | Itoh et al. |
| 6,483,196 | B1 | 11/2002 | Wojnarowski |
| 6,491,443 | B1 | 12/2002 | Serizawa et al. |
| 6,499,863 | B1 | 12/2002 | Dewald |
| 6,505,939 | B1 | 1/2003 | Bierhuizen et al. |
| 6,527,419 | B1 | 3/2003 | Galli |
| 6,547,400 | B1 | 4/2003 | Yokoyama |
| 6,547,423 | B1 | 4/2003 | Marshall |
| 6,561,654 | B1 | 5/2003 | Mukawa et al. |
| 6,570,190 | B1 | 5/2003 | Krames |
| 6,591,037 | B1 | 7/2003 | Yonekubo |
| 6,595,648 | B1 | 7/2003 | Woodgate et al. |
| 6,623,122 | B1 | 9/2003 | Yamazaki et al. |
| 6,639,572 | B1 | 10/2003 | Little et al. |
| 6,644,814 | B1 | 11/2003 | Ogawa |
| 6,646,806 | B1 | 11/2003 | Bierhuizen |
| 6,657,236 | B1 | 12/2003 | Thibeault |
| 6,672,724 | B1 | 1/2004 | Peterson et al. |
| 6,688,747 | B1 | 2/2004 | Wichner et al. |
| 6,726,329 | B1 | 4/2004 | Li et al. |
| 6,733,139 | B1 | 5/2004 | Childers et al. |
| 6,788,471 | B1 | 9/2004 | Wagner |
| 6,843,566 | B1 | 1/2005 | Mihara |
| 2001/0022613 | A1 | 9/2001 | Matsui |
| 2001/0046131 | A1 | 11/2001 | Hoelen |
| 2001/0048493 | A1 | 12/2001 | Swanson |
| 2001/0048560 | A1 | 12/2001 | Sugano |
| 2002/0003636 | A1 | 1/2002 | Conner |
| 2002/0003669 | A1 | 1/2002 | Kedar et al. |
| 2002/0093743 | A1 | 7/2002 | Miyamae |
| 2002/0097000 | A1 | 7/2002 | Muthu |
| 2002/0105807 | A1 | 8/2002 | Loughrey |
| 2002/0114157 | A1 | 8/2002 | Fu-Ming et al. |
| 2002/0145708 | A1 | 10/2002 | Childers et al. |
| 2002/0154277 | A1 | 10/2002 | Mukawa et al. |
| 2002/0159036 | A1 | 10/2002 | Yamagishi |
| 2002/0186350 | A1 | 12/2002 | Peterson |
| 2002/0191395 | A1 | 12/2002 | Fleury |
| 2003/0016539 | A1 | 1/2003 | Minano |
| 2003/0043582 | A1 | 3/2003 | Chan |
| 2003/0133080 | A1 | 7/2003 | Ogawa |
| 2003/0147055 | A1 | 8/2003 | Yokoyama |
| 2003/0193649 | A1 | 10/2003 | Seki |
| 2003/0214815 | A1 | 11/2003 | Ishida et al. |
| 2004/0004176 | A1 | 1/2004 | Liang |
| 2004/0042212 | A1 | 3/2004 | Du et al. |
| 2004/0062044 | A1 | 4/2004 | Kazunari |
| 2004/0062045 | A1 | 4/2004 | Chang |
| 2004/0080938 | A1 | 4/2004 | Holman et al. |
| 2004/0114250 | A1 | 6/2004 | Kato |
| 2004/0174501 | A1 | 9/2004 | Slobodin et al. |
| 2004/0202007 | A1 | 10/2004 | Yagi et al. |
| 2004/0207816 | A1 | 10/2004 | Manabu et al. |
| 2005/0094401 | A1* | 5/2005 | Magarill ................ 362/296 |
| 2005/0134811 | A1* | 6/2005 | Magarill et al. ............ 353/94 |
| 2005/0174768 | A1* | 8/2005 | Conner .................. 362/235 |
| 2005/0174771 | A1* | 8/2005 | Conner .................. 362/244 |
| 2005/0174775 | A1* | 8/2005 | Conner .................. 362/268 |

FOREIGN PATENT DOCUMENTS

| | | |
|---|---|---|
| EP | 0 322 070 | 6/1989 |
| EP | 0 493 800 | 7/1992 |
| EP | 0 587 371 | 6/1994 |
| EP | 0 740 178 | 10/1996 |
| EP | 0 795 771 | 9/1997 |
| EP | 0 837350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 333 A | 10/2003 |
| EP | 1 363 460 | 11/2003 |
| EP | 1 398 659 | 3/2004 |
| GB | 1 195 547 A | 6/1970 |
| JP | 09-018072 | 1/1997 |
| JP | 10-123512 | 5/1998 |
| JP | 11-231316 | 8/1999 |
| JP | 2000-305040 | 11/2000 |
| JP | 2002184206 | 12/2000 |
| JP | 2002-133932 | 5/2002 |
| JP | 2002-177218 A | 6/2002 |
| JP | 2002-184206 | 6/2002 |
| JP | 2003-330109 | 11/2003 |
| JP | 2005-128236 | 5/2005 |
| TW | 531 662 B | 5/2003 |
| WO | WO 02/48775 A | 6/2002 |
| WO | WO 2002/065184 | 8/2002 |
| WO | WO 03/56876 | 7/2003 |
| WO | WO 2003/56876 | 7/2003 |
| WO | WO 2002/043076 | 5/2004 |
| WO | WO 2004/107751 | 12/2004 |
| WO | WO 2004/109366 | 12/2004 |
| WO | WO 2005/078496 | 8/2005 |

OTHER PUBLICATIONS

Jacobson, et al., "Novel Compact Non-Imaging Collectors for LED Arrays", Illumitech, Inc., bjacobson@illumitech.com.

Secondary Optics Design Considerations for SuperFlux LEDs, application brief AB20-5, Appendix 5A, pp. 5-22.

Steve Paolini, Gerard Harbers, Matthijs Keuper, Lumileds, Light from Silicon Valley, High-Power LED Illuminators in Projection Displays, pp. 1-19.

Gerhard Harbers, Wim Timmers, Willem Sillevis-Smitt, LED Backlighting for LCD HDTV, Journal of the SID, Oct. 4, 2002, pp. 347-350.

LumiBright Light Engine, Innovations in Optics, Inc, Woburn, Massachusetts.

LumiLeds Lighting, U.S., LLC, "Power Light Source Luxeon™ Emitter", Document#DW25 (Jul. 25, 2003) pp. 1-12.

Smith, Warren J. "Modern Optical Engineering The Design of Optical Systems", McGraw-Hill Third Edition, (2000) pp. 245-247, 470-474.

Stupp, Edward H. and Brennesholtz, Matthew S. "Projection Displays" Modeling Lumen Throughput "Etendue at a flat surface" John Wiley & Sons, Inc. III Series (1999) pp. 244-245.

Laikin, Milton, "Lens Design-Third Edition, Revised and Expanded", Table of Contents, pp. 305-312, Marcel Dekker, New York, 2001.

Melles Griot: "Specifying Laser Diode Optics" Online!2000, 2002 XP002323875, Section "Focusing Lenses For Fiber Optics" Lines 19-23, Figures 3,4.

Light Emitting Diodes 2003, Oct. 15-17, 2002, "Optical Design for LED Based Devices" Juan Manuel Teijido, Sony International (Europe) GmbH, Sony Corporate Laboratories Eurpope.

* cited by examiner

ILLUMINATION SYSTEM WITH NON-RADIALLY SYMMETRICAL APERTURE

FIELD OF THE INVENTION

The present disclosure relates to illumination systems that may find application, for example, in projection systems. More specifically, the present disclosure relates to illumination systems having a non-radially symmetrical angular intensity distribution before an integrator.

BACKGROUND

Typical projection systems include a source of light, illumination optics, one or more image-forming devices, projection optics and a projection screen. The illumination optics collect light from one or more light sources and direct that light in a predetermined manner to one or more image-forming devices. The image-forming devices, controlled by an electronically conditioned and processed digital video signal or by other input data, produce images corresponding to the video signal or to that data. Projection optics then magnify the image and project it onto the projection screen. White light sources, such as arc lamps, in conjunction with color-maintaining systems, have been and still are predominantly used as light sources for projection display systems. However, recently, light emitting diodes (LEDs) were introduced as an alternative. Some advantages of LED light sources include longer lifetime, higher efficiency and superior thermal characteristics.

Examples of image-forming devices frequently used in projection systems include digital micro-mirror devices, or digital light processing devices (DLPs), liquid crystal on silicon devices (LCoS) and high temperature polysilicon liquid crystal devices (HTPS-LCD). Illumination optics of common projection systems often include integrators. Integrators typically serve to homogenize light supplied into their input ends via reflections at the integrators' walls. Presently known integrators include mirror tunnels, for example, rectangular tunnels, solid or hollow, and elongated tunnels composed of solid glass rods that rely on total internal reflection to transfer light.

SUMMARY

The present disclosure is directed to illumination systems including a light source or a bank of light sources having a non-radially symmetrical aperture. The aperture has a longer dimension and a shorter dimension, so that the light source or the bank of light sources produces illumination with a non-radially symmetrical angular intensity distribution having a larger angular dimension and a smaller angular dimension. The illumination systems also include an integrator having an entrance end optically connected to the light source or the bank of light sources, an exit end, and a dimension that experiences a larger increase from the entrance end to the exit end. The integrator is disposed so that the dimension of the integrator experiencing the larger increase is substantially aligned with the larger angular dimension of illumination produced at the entrance end of the integrator.

The present disclosure is also directed to illumination systems including a plurality of banks of light sources, each bank of light sources having a non-radially symmetrical aperture with a longer dimension and a shorter dimension. The banks of light sources produce illumination with non-radially symmetrical angular intensity distributions having a larger angular dimension and a smaller angular dimension. Such illumination systems also include an integrator having an entrance end optically connected to the banks of light sources and an exit end having a longer dimension and a shorter dimension. The integrator and the banks of light sources are disposed so that the longer dimension of the exit end of the integrator is substantially aligned with each larger angular dimension of illumination produced at the entrance end of the integrator.

These and other aspects of the illumination systems of the subject invention will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein.

DETAILED DESCRIPTION

Figure 1:
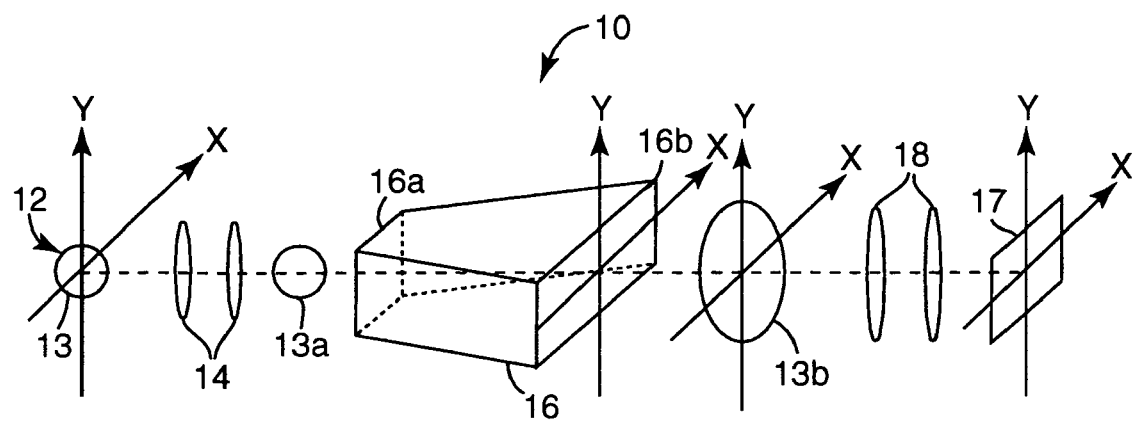
FIG. 1 is a schematic perspective view of a known illumination system including a generally trapezoidal integrator.

Referring now to the drawings, wherein like reference numbers designate similar elements, there is shown in FIG. 1 a traditional illumination system 10. The illumination system 10 includes a light source 12 having a generally circularly symmetrical aperture 13, collection optics 14, an integrator 16, relay optics 18 and an illumination target 17, such as an image-forming device. In some traditional illumination systems, the integrator 16 has a trapezoidal shape, for example, with a generally square entrance end 16a and a generally rectangular exit end 16b. Such a trapezoidal integrator 16 reshapes the angular intensity distribution of the light passing through, transforming a generally circularly symmetrical angular intensity distribution at the entrance end 16a, illustrated as 13a, into a non-radially symmetrical, typically elliptical, angular intensity distribution at the exit end of the integrator 16b, illustrated as 13b. Because common projection optics (not shown), such as one or more lenses, are round, a non-radially symmetrical angular intensity distribution of light at the exit end of the integrator may cause clipping by projection optics, thus resulting in loss of light that could otherwise be directed to an observer, a projection screen, etc.

Figure 2A:
FIGS. 2A–2C represent angular light distributions at the entrance end of a trapezoidal integrator corresponding to round angular intensity distributions at the exit end, produced by reversed raytracing for three different lengths of the integrator.
Figure 2B:
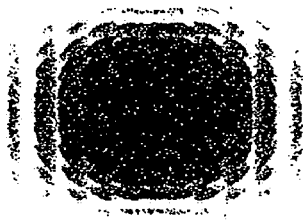
Figure 2C:
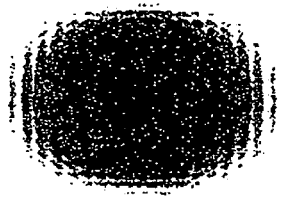

Assuming that a generally circularly symmetrical angular intensity distribution at the exit end of a trapezoidal integrator is desirable, reversed raytracing can be performed to determine the angular intensity distribution at the entrance end of the integrator that will lead to such an angular intensity distribution at the exit end. For example, for a hollow integrator with a generally square entrance end of about 6.1×6.1 mm and a generally rectangular exit end of about 16.0×13.0 mm, a generally circularly symmetrical angular intensity distribution with the angular extent of about ±12.7 degrees will be produced, if the angular intensity distribution at the entrance end is generally as shown in FIGS. 2A–2C. The figures represent non-radially symmetrical (here, generally elliptical) shapes having a larger angular dimension and a smaller angular dimension, such that the larger angular dimension is aligned substantially with the longer dimension of the exit end of the integrator. FIG. 2A shows the result of reversed raytracing for an integrator about 75 mm long, where the larger angular dimension was found to be about ±35 degrees, and the smaller angular dimension was found to be about ±28 degrees. FIGS. 2B and 2C show the results of reversed raytracing for the integrators that are about 100 and about 200 mm long, respectively.

Figure 3:
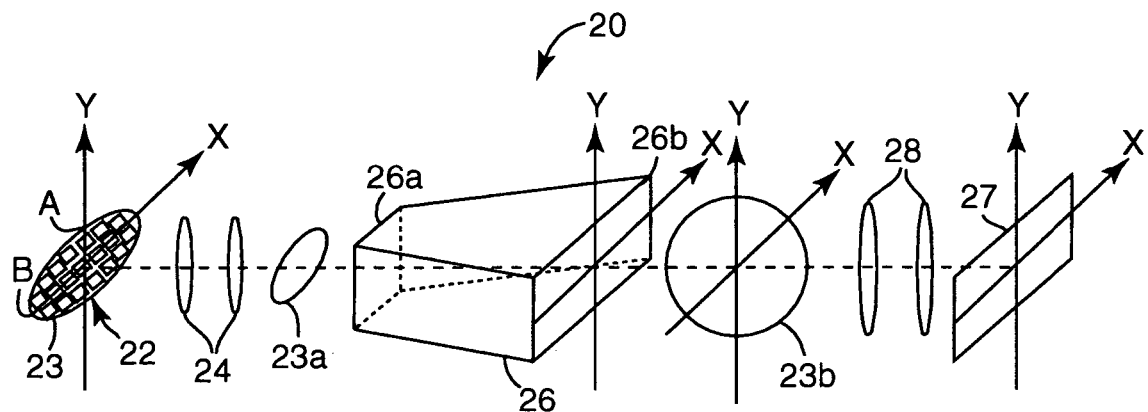
FIG. 3 is a schematic perspective view of an exemplary illumination system constructed according to the present disclosure.

FIG. 3 represents a schematic perspective view of an exemplary illumination system 20 constructed according to the present disclosure, such that light fills the angular space represented by a shape shown in FIGS. 2A–2C at an entrance end of an integrator. The exemplary illumination system 20 includes a light source or a bank of light sources 22, an integrator 26 and an illumination target 27, such as an image-forming device. In some embodiments, the illumination system further includes one or both of the optional collection optics 24 and optional relay optics 28.

The integrator 26 illustrated in FIG. 3 has a generally square entrance end 26a and a generally rectangular exit end 26b, although the shapes of the entrance and exit ends may vary. For example, the entrance end 26a can have a generally rectangular shape having at least one dimension that is smaller than at least one dimension of the exit end 26b, and the exit end 26b, in some embodiments, can have a generally square shape with the side that is larger than at least one dimension of the entrance end 26a. The configurations illustrated in FIG. 3 are particularly useful where one or more of the light sources have square emitting surfaces and where the illumination target, such as an image-forming device, has a rectangular shape. Thus, the shape of the integrator's entrance end can match one or more shapes of the emitting surfaces, while the shape of the exit end can match the shape of the illumination target.

In most embodiments, the longer dimension of the exit end 26b should be substantially aligned with the longer dimension of the image-forming device 27. Those of ordinary skill in the art will readily appreciate that the dimensions could be brought in the desired state of alignment in the vicinity of the illumination target, such as where folding mirrors or other direction-altering optics are used. In some exemplary embodiments, the exit end 26b has substantially the same aspect ratio as the illumination target 27, for example, about 16:9, which is the case for typical image-forming devices, such as LCoS or DLP. In the exemplary embodiments including relay optics 28, the relay optics can be configured to image the exit end of the integrator 26b onto the illumination target 27. Typically, the illumination system 20 is configured so that illumination falling onto the illumination target 27 overfills it, for example, by about 3% to about 10% by area. In some exemplary embodiments, the optical elements disposed before the integrator 26 may be configured to image one or more emitting surfaces of the one or more light sources 22 onto the entrance end 26a of the integrator 26.

Referring further to FIG. 3, the light source or bank of light sources 22 is configured so that it has a non-radially symmetrical aperture 23, preferably generally elliptically shaped, having a shorter dimension A aligned substantially along the Y axis of the system 20 and a longer dimension B aligned substantially along the X axis of the system 20. In this exemplary embodiment, the longer dimensions of the integrator exit end 26b and of the illumination target 27, such as an image-forming device, are aligned substantially along the X axis of the system 20, while their shorter dimensions are aligned substantially along the Y axis of the system 20. However, those of ordinary skill in the art will readily appreciate that the appropriate dimensions of the light source or bank of light sources 22 and those of the integrator 26 should be aligned appropriately, so as to produce the desired angular intensity distribution at the entrance end of the integrator. Such would be the case where folding mirrors or other direction-altering optics are used.

Configurations of the banks of light sources similar to that shown in FIG. 3 produce beams with non-radially symmetrical angular intensity distributions, illustrated as 23a, in the space of the entrance end of the integrator 26a. The angular intensity distribution 23a has a larger angular dimension corresponding to the longer dimension B of the aperture 23 and a smaller angular dimension corresponding to the shorter dimension A of the aperture 23. In the exemplary embodiment shown, the larger angular dimension of the illumination's angular intensity distribution is substantially aligned with the longer dimension of the exit end 26b of the integrator 26. The dimensions could be brought in alignment at the entrance end 26a of the integrator 26, such as where folding mirrors or other direction-altering components are used. The integrator 26 processes the beam in such a way that it emerges from the exit end 26b as a beam of a more radially symmetrical angular intensity distribution, illustrated as 23b.

In the exemplary embodiments where the integrators have other shapes of entrance and exit ends, the larger angular dimension of the illumination's angular intensity distribution at the entrance end of the integrator should be aligned substantially along the plane containing the dimension of the integrator that experiences a larger increase from the entrance end to the exit end. In the embodiment shown in FIG. 3, the direction experiencing a larger increase is oriented substantially along the X axis, where a side of the generally square entrance end 26a of the integrator 26 is transformed to a longer side of the generally rectangular exit end 26b of the integrator 26.

Figure 3A:
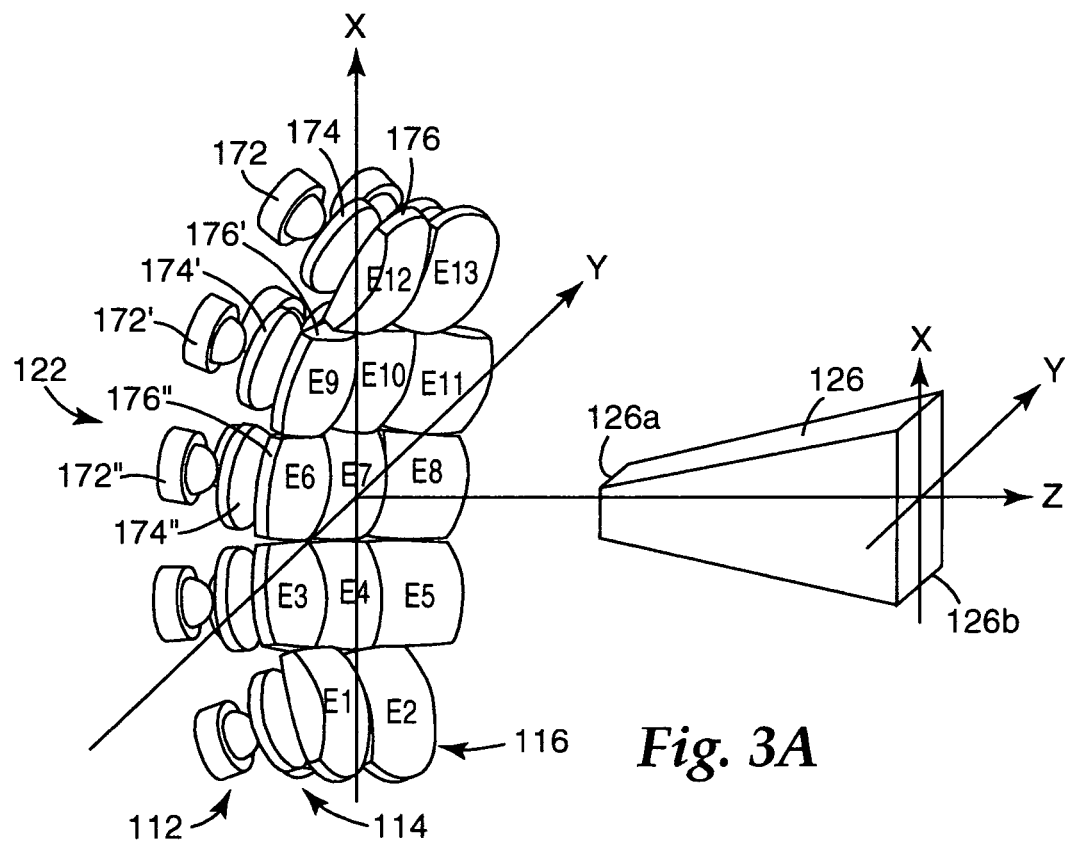
FIG. 3A is a perspective view of an exemplary configuration of a bank of light sources, suitable for use in the exemplary illumination systems illustrated in FIG. 3.

An exemplary configuration of a bank of light sources 122, suitable for use in a system illustrated in FIG. 3, and of its positioning with respect to a trapezoidal integrator 126 are presented in FIG. 3A. The bank of light sources 122 includes a set of light sources 112, such as light sources 172, 172', 172", a first set of refractive optical elements 114, such as meniscus lenses 174, 174', 174", and a second set of refractive elements 116, such as plano-convex or double-convex lenses 176, 176', 176". In some exemplary embodiments, the elements of the first set 114 of refractive optical elements may include lenses of generally circular outer shape, while the elements of the second set 116 of refractive optical elements may include at least some lenses having generally square or hexagonal outer shapes, so that they could be closely packed to minimize interstitial areas. As shown in FIG. 3A, the set of light sources 112, the first set of refractive elements 114 and the second set of refractive elements 116 are disposed to form an aperture with a generally elliptical outer shape, which is arranged before a generally square entrance end 126a of the integrator 126, so that the longer dimension of the generally elliptical aperture is aligned substantially along the longer dimension of the integrator's generally rectangular exit end 126b, which in this exemplary embodiment also corresponds to the dimension of the integrator 126 that experiences a larger increase from the entrance end 126a to the exit end 126b.

In some exemplary embodiments, the banks of light sources 122 are also configured to form individual aimed-in channels, which include one or more optical elements associated with each light source, such as one or more lenses directing and focusing at least a portion of the emission of the light sources onto the entrance end 126a of the integrator. Exemplary configurations of such banks of light sources are described in a commonly owned and concurrently filed Magarill et al. U.S. patent application entitled "Illumination Systems With Separate Optical Paths for Different Color Channels," Ser. No. 10/845,677, the disclosure of which is hereby incorporated by reference herein to the extent it is not inconsistent with the present disclosure. In particular, in the bank of light sources 122, pairs of refractive optical elements, such as 174 and 176, 174' and 176', 174" and 176", are associated with each of the light sources of the set of light sources 112, such as 172, 172', 172", respectively. The individual channels are aimed, for example, by arranging the set of light sources 112 tangentially to and along a curved surface, such as a spherical surface centered at the entrance end of the integrator, with the sets of refractive elements 114 and 116 substantially tracking that configuration.

In such exemplary embodiments, a light source and the associated refractive element or elements, for example, the light source 172 and the refractive optical elements 174 and 176, form each aimed-in channel. In some embodiments, the sets of refractive optical elements 114 and 116 are configured to image the emitting surfaces of the light sources, for example the emitting surfaces of LEDs, onto the entrance end 126a of the integrator 126. However, a variety of different suitable light sources and a variety of refractive optical elements of different shapes and sizes may be used in the appropriate embodiments of the present disclosure. The number of refractive optical elements may vary as well, such as the number of refractive optical elements associated with each light source. Alternatively, light sources can be incorporated into assemblies of reflective optical elements to form the non-radially symmetrical apertures described herein.

Figure 4:
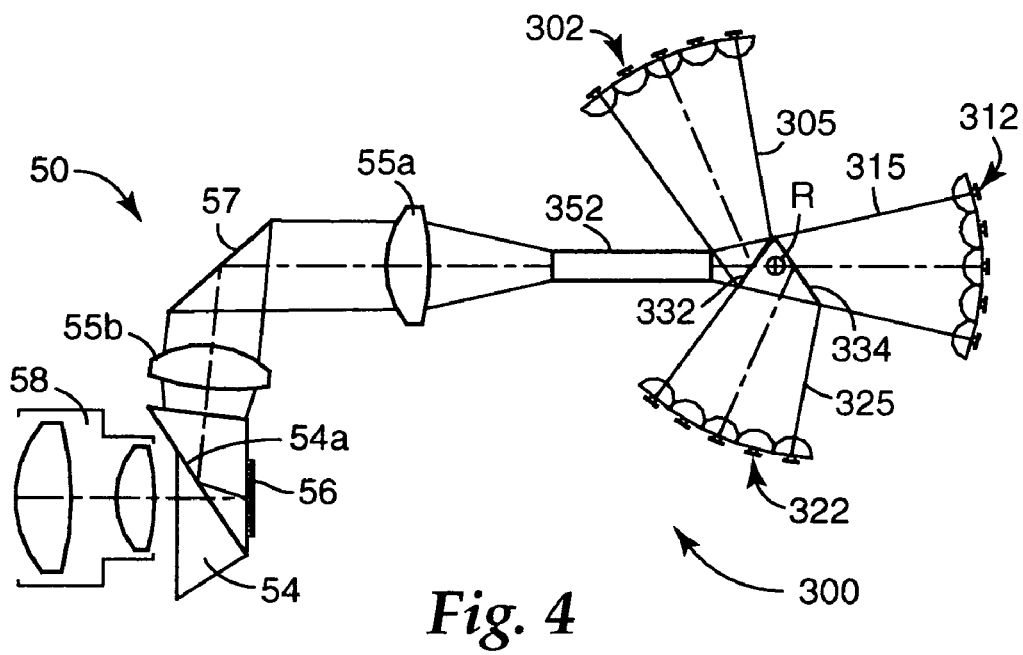
FIG. 4 is a schematic cross-sectional view of another exemplary illumination system constructed according to the present disclosure.

Another exemplary embodiment of the illumination systems constructed according to the present disclosure is illustrated in FIG. 4, which shows schematically a portion of a one-panel projection system 50 incorporating an exemplary illumination system 300. The illumination system 300 includes channels corresponding to different primary colors, illustrated in FIG. 4 as a red color channel 305, a green color channel 315 and a blue color channel 325. Illumination systems utilizing light sources and channels of other colors and different numbers of channels, as suitable for a particular application, are also within the scope of the present disclosure.

The red color channel 305 includes a bank of red light sources 302, such as red LEDs, and a dichroic combiner 332, such as a dichroic mirror. The green color channel 315 includes a bank of green light sources 312, such as green LEDs, and dichroic combiners 332 and 334, such as dichroic mirrors. The blue color channel 325, in turn, includes a bank of blue light sources 322, such as blue LEDs, and dichroic combiners 332 and 334. The dichroic combiner 334 is constructed so that it transmits in the green portion of the visible spectrum, while exhibiting relatively high reflectivity in the blue portion of the visible spectrum. Thus, the dichroic combiner 334 transmits green light emanating from the bank of green light sources 312 while reflecting light emanating from the bank of the blue light sources 322 to form a combined beam of green and blue light incident onto the dichroic combiner 332.

Figure 4A:
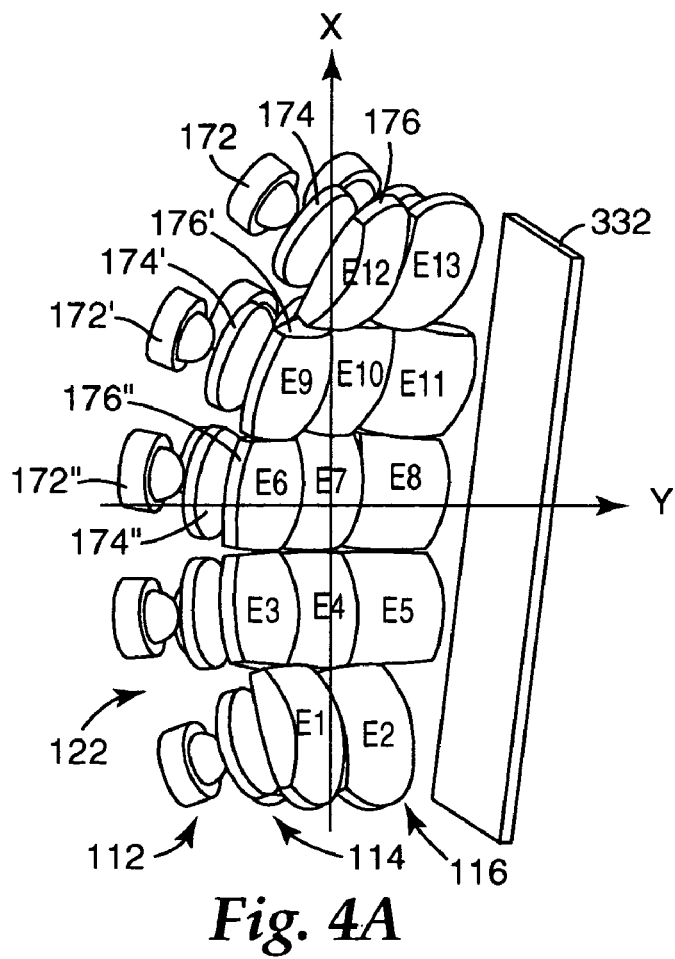
FIG. 4A illustrates the placement of an exemplary light source bank having a non-radially symmetrical aperture with respect to a dichroic mirror in a system similar to that shown in FIG. 4.

The dichroic combiner 332, in turn, transmits in the green and blue portions of the visible spectrum, while exhibiting relatively high reflectivity in the red portion of the spectrum. Thus, the dichroic combiner 332 transmits the green and blue light incident upon it from the banks of light sources 312 and 322, while reflecting the red light emanating from the bank of red light sources 302 to form a combined beam of green, blue and red light incident onto the entrance end of a common integrator 352. In the exemplary embodiment shown, the banks of light sources 302, 312 and 322 are preferably configured as shown in and described in reference to FIG. 3A, and in that case, they should be disposed so that the longer dimension of the light source bank is arranged substantially parallel to the axis of rotation (or tilt) R of the dichroic mirrors, as shown in FIG. 4 by an arrow pointing into the plane of the drawing. Such orientation and arrangement, illustrated in more detail in FIG. 4A, would be desirable, because the longer dimension of the bank of light sources corresponds to the larger angular dimension of the elliptical cone of light. Reducing variation of the angles of incidence onto the dichroics could help reduce color shift.

If the light sources and the associated refractive elements are disposed generally along and tangentially to spherical surfaces, such surfaces are preferably centered at the entrance end of the integrator 352. In some exemplary embodiments, the optical elements can be configured to image one or more of the emitting surfaces of the one or more light sources onto the entrance end of the integrator. However, other suitable configurations of light source banks may be used with this and other embodiments of the present disclosure. In the exemplary embodiments utilizing a trapezoidal integrator 352, the longer dimension of the exit end of the integrator 352 can be aligned substantially along the longer dimensions of the banks of light sources, but other orientations producing the desired angular intensity distribution at the entrance end are also within the scope of the present disclosure.

The illumination system 300 of the projection system 50 can further include a relay optic, such as relay lenses 55a and 55b, a fold mirror 57 disposed between the lenses, image-forming device 56 and one of the following elements: a TIR prism assembly 54, a polarizing beam splitter (PBS) and one or more polarizers. The projection system 50 can further include projection optics 58. In some embodiments of the present disclosure, the system may be configured so that the relay optics image the exit end of the integrator 352, onto the image-forming device 56. The TIR prism assembly 54 serves to redirect the light exiting relay optics onto the image-forming device 56, for example, via the reflection at the facet 54a. Light modulated by the image-forming device 56 passes through the TIR prism assembly 54 and is collected by projection optics 58, such as one or more lenses, for delivery to a screen (not shown) or to another optical element or device for further processing.

In applications such as projection television, typical illumination systems should use light having certain proportions of red, green and blue primary components to provide a desired color temperature on a screen. Often, one of the components is the limiting factor on the system performance. In some exemplary illumination systems constructed according to the present disclosure, additional brightness can be achieved by including light sources (or groups of light sources) of different shades within the wavelength range of a particular color channel. Each such light source or group of light sources has a different peak wavelength and their illumination may be combined with wavelength-selective elements, such as dichroic mirrors or diffractive optics, for example, diffraction gratings. Any light sources with relatively narrow spectra can be used, such as LEDs, lasers, or phosphorescent materials.

Figure 5:
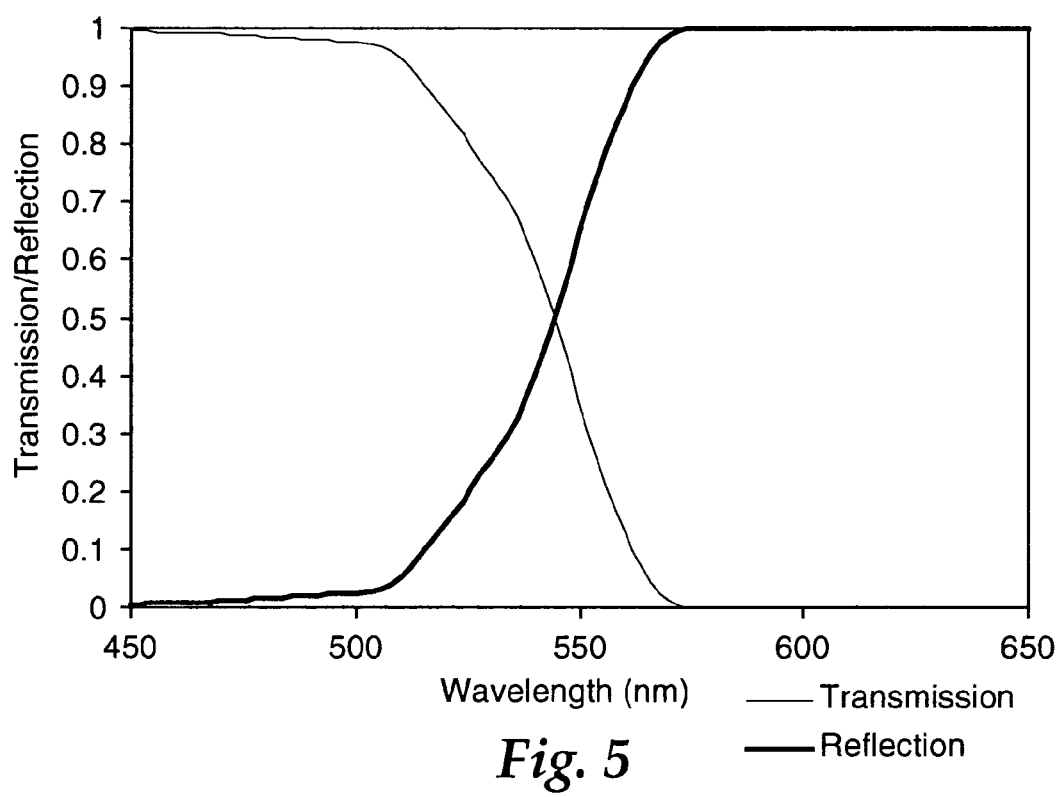
FIG. 5 illustrates modeled transmission and reflection performance characteristics of a dichroic combiner suitable for combining different shades of green LEDs into the same color channel.
Figure 6:
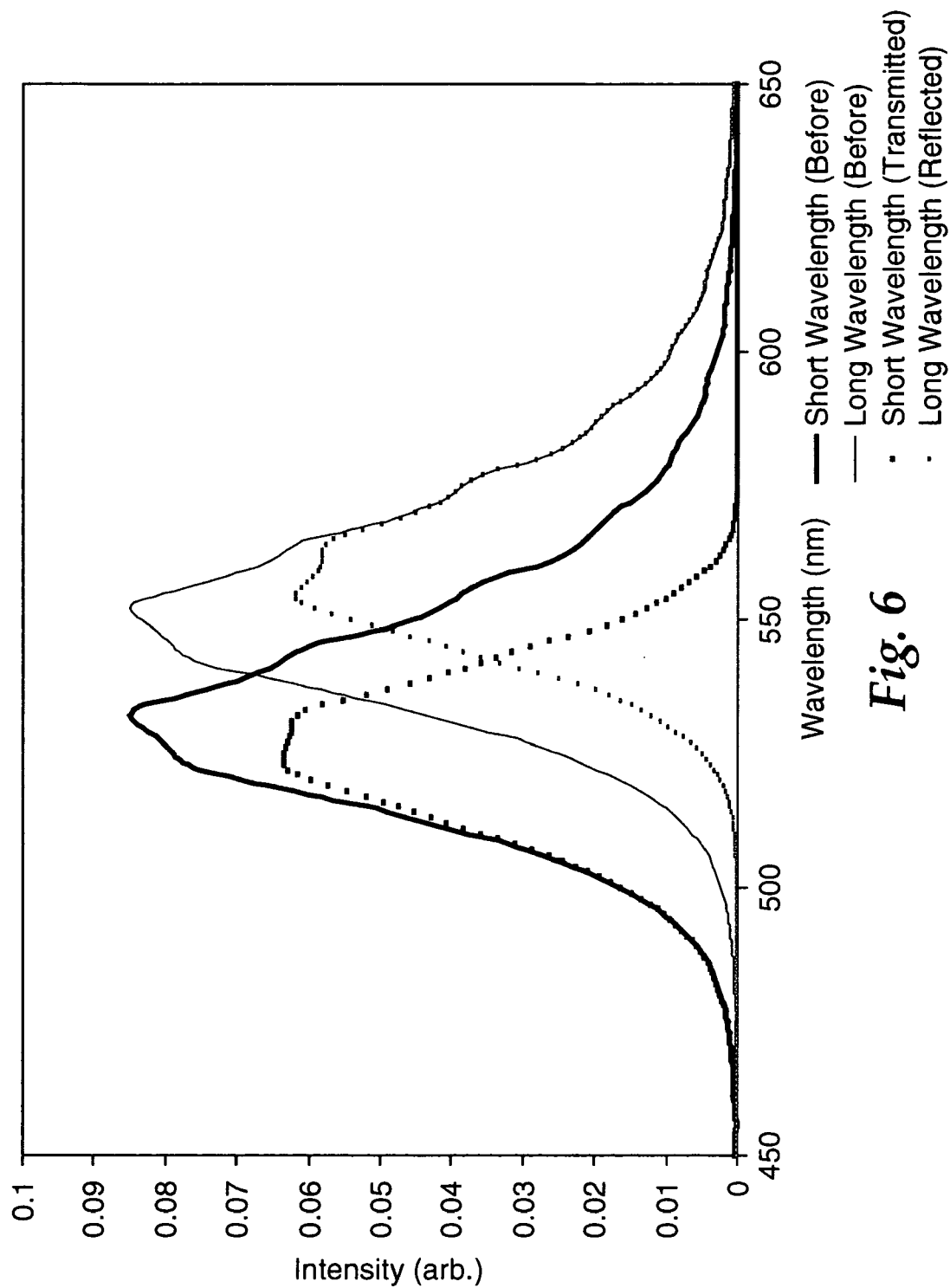
FIG. 6 shows spectra of two groups of green LEDs of different shades, before (solid lines) and after (dotted lines) a dichroic combiner.

FIG. 5 illustrates modeled transmission and reflection performance characteristics of a dichroic mirror suitable for combining different shades of green LEDs into the same color channel. Such a dichroic mirror may be suitably placed between the groups of LEDs to combine their illumination. The dichroic mirror was modeled as a 32-layer thin film coating with about 45-degree angle of incidence of the principal ray with an about +/−6 degree cone of incident light. The transmission and reflection curves are shown for p-polarization, which is suitable for LCoS systems and other systems that use polarized light. FIG. 6 shows spectra of two groups of green LEDs of different shades, before (solid lines) and after (dotted lines) a dichroic mirror with the performance illustrated in FIG. 5. The two LED spectra shown were created by shifting as needed a measured spectrum from a Luxeon™ LXHL-PM09 green emitter, available from Lumileds Lighting Company, so that the combined spectrum would provide a desired color.

Figure 7:
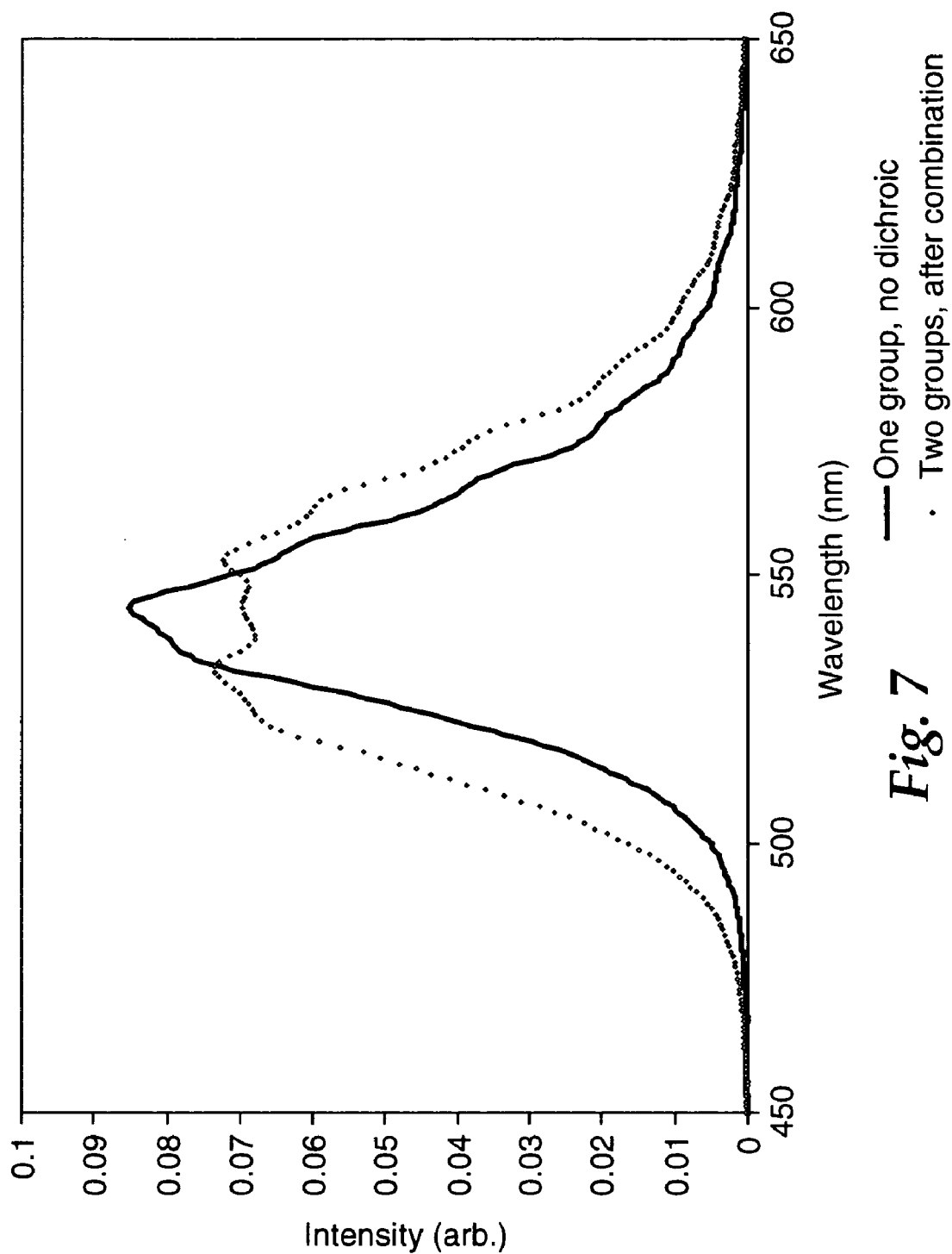
FIG. 7 represents a comparison of the emission spectrum of a group of green LEDs of the same type (solid line) with the spectra of two groups of LEDs of different color shades having offset peak wavelengths that were combined with a dichroic (dotted line)
Figure 8:
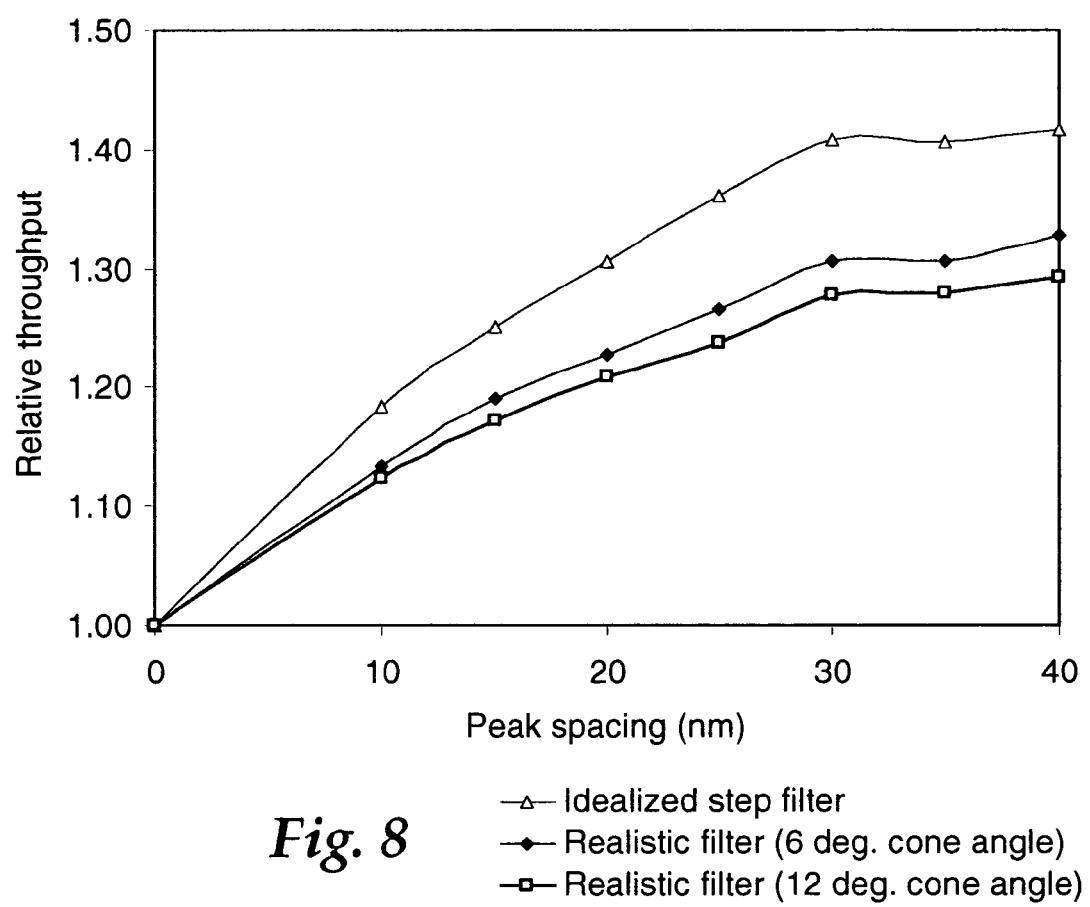
FIG. 8 shows plots representing fractional increase in the net luminous flux realized by combining the two groups of LEDs as a function of the peak-to-peak spacing of the LED spectra.

FIG. 7 represents a comparison of the emission spectrum of a group including an arbitrary number N of green LEDs of the same type (solid line) with the spectra of two groups, each group having N LEDs, of different color shades having offset peak wavelengths that were combined with a dichroic mirror (dotted line). Thus, by combining two groups of LEDs, a net gain in overall lumens throughput can be achieved, as illustrated in FIG. 8. FIG. 8 shows plots representing calculated fractional increase in the net luminous flux realized by combining the two groups of LEDs with the performance illustrated in FIGS. 6 and 7 as a function of the peak-to-peak spacing of the LED spectra. Different curves correspond to the modeled performance of a dichroic mirror operating as an idealized step filter, a dichroic mirror operating as a realistic filter for about 6-degree half-angle incident cone of light, and a dichroic mirror operating as a realistic filter for about 12-degree half-angle of the incident cone.

It has been found that the calculated fractional increase in the net luminous flux increased as the peak spacing was increased from about 0 to about 40 nm. For the modeled exemplary light sources characterized in FIGS. 5–7 (about 20 nm peak-to-peak spacing and about 6 degree cone half-angle), about 22% more lumens are provided by the illumination system utilizing LEDs of different shades. In addition, it has been found that the peak spacing of the LEDs can be increased up to 40 nm before the color coordinates of the green channel fall short of the guidelines prescribed by SMPTE C colorimetry. Thus, more light can be coupled into a system, at the expense of a certain amount of color saturation, by creating a combined spectrum that is wider than that of an individual source. Because the spectrum of a single typical high brightness LED is usually narrow enough that the color saturation of the resulting channel is better than required for typical projection television applications, the extra spectral region may be used to couple light from additional LEDs of different shades.

Exemplary components suitable for use in some exemplary illumination systems of the present dislosure include LED light sources, such as green Luxeon™ III Emitters, LXHL-PM09, red Luxeon™ Emitters, LXHL-PD01, and blue Luxeon™ III Emitter, LXHL-PRO9. The LEDs can be arranged as shown in and described in reference to FIG. 3A. For example, 13 LEDs can be disposed along a spherical surface centered at the entrance end 126a of the integrator 126. First and second refractive optical elements, such as lenses 174 and 176, can be disposed in front of each LED as also shown in FIG. 3A, so that the distance from the vertex of each second lens of the second set of refractive optical elements 116 to the center of the integrator entrance end 126a is about 50.0 mm. Other exemplary parameters of suitable light source banks and suitable integrators are presented in Table 1:

TABLE 1

Design parameters of light source banks and integrators

| Surface | Radius (mm) | Distance to the Next Surface (mm) | Material | Clear Aperture (mm) | Conic Constant |
|---|---|---|---|---|---|
| LED Dome | | 2.800 | 3.17 | | 5.6 | |
| First Lens 174 | 1 | 24.702 | 4.00 | Acrylic, n = 1.4917 | 9.82 | 11.664 |
| | 2 | 6.574 | 0.02 | | 11.40 square | |
| Second Lens 176 | 3 | −44.133 | 6.00 | Acrylic, n = 1.4917 | 6.1 × 6.1 | |
| | 4 | 9.39 | 50.00 | | | −1.3914 |
| Integrator | | | (6.1 × 6.1) × 50.0 × (6.1 × 10.7) mm | | | |

The banks of light sources can be arranged along a spherical surface by rotation of the LEDs with the associated refractive elements around the middle of the integrator entrance end. Angles of rotation in the XZ and YZ planes are shown in Table 2 in degrees:

TABLE 2

Angular coordinates of light source bank elements

| Element | Rotation in X plane (degrees) | Rotation in Y plane (degrees) |
|---|---|---|
| 1 | −6.5 | −26 |
| 2 | 6.5 | −26 |
| 3 | −13 | −13 |
| 4 | 0 | −13 |
| 5 | 13 | −13 |
| 6 | −13 | 0 |
| 7 | 0 | 0 |
| 8 | 13 | 0 |
| 9 | −13 | 13 |
| 10 | 0 | 13 |
| 11 | 13 | 13 |
| 12 | −6.5 | 26 |
| 13 | 6.5 | 26 |

Illumination systems constructed according to the present disclosure have a variety of advantages. For example, such illumination systems can incorporate LED light sources, which have increased lifetime as compared to the traditional high-pressure mercury arc lamps, lower cost, better environmental characteristics, and do not emit infrared or ultraviolet light, eliminating the need for UV filters and cold mirrors. In addition, LEDs are driven by low voltage DC electrical power, which is much less likely to cause electrical interference with the sensitive display electronics than does the high voltage AC ballast that drives an arc lamp. Furthermore, due to their relatively narrow bandwidth, LEDs provide better color saturation without sacrificing brightness.

Although the illumination systems of the present disclosure have been described with reference to specific exemplary embodiments, those of ordinary skill in the art will readily appreciate that changes and modifications can be made thereto without departing from the spirit and scope of the present invention. For example, dimensions, configurations, types and numbers of optical elements, such as refractive or, where suitable, reflective elements, used in the embodiments of the present disclosure can vary depending on the specific application and the nature and dimensions of the illumination target. Illumination systems utilizing light sources and channels of other colors as well as different numbers of channels, as suitable for a particular application, are also within the scope of the present disclosure. The exemplary embodiments of the present disclosure may be used with a variety of light sources, such as LEDs of other colors, organic light emitting diodes (OLED), vertical cavity surface emitting lasers (VCSEL) and other types of laser diodes, phosphorescent light sources and other suitable light emitting devices.

What is claimed is:

1. An illumination system, comprising:
a light source having a non-radially symmetrical aperture, the aperture having a longer dimension and a shorter dimension, the light source producing illumination with a non-radially symmetrical angular intensity distribution having a larger angular dimension and a smaller angular dimension; and
an integrator having an entrance end optically connected to the light source and an exit end having a longer dimension and a shorter dimension, the integrator being disposed so that the longer dimension of the exit end is substantially aligned with the larger angular dimension of the illumination produced by the light source at the entrance end of the integrator.

2. The illumination system as recited in claim 1, wherein the exit end of the integrator is generally rectangular, the entrance end of the integrator is generally square, and the aperture is generally elliptical.

3. The illumination system as recited in claim 1, further comprising one or more of: a relay optic, a TIR prism, a PBS, a polarizer and a fold mirror, optically connected to the exit end of the integrator.

4. The illumination system as recited in claim 1, further comprising an illumination target optically connected to the exit end of the integrator and relay optics disposed between the illumination target and the exit end of the integrator, wherein the relay optics are configured to image the exit end of the integrator onto the illumination target.

5. The illumination system as recited in claim 1, further comprising an illumination target having a shape and optically connected to the exit end of the integrator, wherein the exit end of the integrator has a shape that substantially matches the shape of the illumination target.

6. An illumination system, comprising:
a bank of light sources having a non-radially symmetrical aperture, the aperture having a longer dimension and a shorter dimension, the light source producing illumination with a non-radially symmetrical angular intensity distribution having a larger angular dimension and a smaller angular dimension; and
an integrator having an entrance end optically connected to the bank of light sources and an exit end having a longer dimension and a shorter dimension, the integrator being disposed so that the longer dimension of the exit end is substantially aligned with the larger angular dimension of the illumination produced by the bank of light sources at the entrance end of the integrator.

7. The illumination system as recited in claim 6, wherein the bank of light sources comprises a plurality of light sources and a plurality of refractive optical elements.

8. The illumination system as recited in claim 7, wherein each of the plurality of light sources has an emitting surface and the refractive elements are configured to image at least some of the emitting surfaces onto the entrance end of the integrator.

9. The illumination system as recited in claim 8, wherein the entrance end of the integrator has a first shape and each of the emitting surfaces of the plurality of light sources has a second shape that substantially matches the first shape.

10. The illumination system as recited in claim 7, wherein the plurality of light sources and the plurality of refractive optical elements are configured so that a different refractive optical element is associated with each light source.

11. The illumination system as recited in claim 6, wherein the bank of light sources comprises a plurality of light sources and a plurality of refractive optical elements, and wherein the light sources and the refractive elements are configured to form a plurality of aimed-in channels.

12. The illumination system as recited in claim 6, wherein the exit end of the integrator is generally rectangular, the entrance end of the integrator is generally square, and the aperture is generally elliptical.

13. The illumination system as recited in claim 6, further comprising one or more of: a relay optic, a TIR prism, a PBS, a polarizer and a fold mirror, optically connected to the exit end of the integrator.

14. The illumination system as recited in claim 6, further comprising an illumination target optically connected to the exit end of the integrator and relay optics disposed between the illumination target and the exit end of the integrator, wherein the relay optics are configured to image the exit end of the integrator onto the illumination target.

15. The illumination system as recited in claim 6, further comprising an illumination target having a shape and optically connected to the exit end of the integrator, wherein the exit end of the integrator has a shape that substantially matches the shape of the illumination target.

16. The illumination system as recited in claim 6, wherein the bank of light sources includes light sources of different color shades.

17. The illumination system as recited in claim 6, wherein the bank of light sources includes a plurality of light sources of a first shade, a plurality of light sources of a second shade and a dichroic combiner for combining light of the first and second shades.

18. The illumination system as recited in claim 17, wherein the light sources of the first shade emit light with a first peak wavelength and the light sources of the second shade emit light with a second peak wavelength, and wherein the first and second peak wavelengths are separated by no more than about 40 nm.

19. An illumination system, comprising:
   a plurality of banks of light sources, each bank of light sources having a non-radially symmetrical aperture with a longer dimension and a shorter dimension and producing illumination with a non-radially symmetrical angular intensity distribution having a larger angular dimension and a smaller angular dimension; and
   an integrator having an entrance end optically connected to the banks of light sources and an exit end having a longer dimension and a shorter dimension, the integrator and the banks of light sources being disposed so that the longer dimension of the exit end of the integrator is substantially aligned with each larger angular dimension of the illumination produced by each bank of light sources at the entrance end of the integrator.

20. The illumination system as recited in claim 19, wherein at least one of the banks of light sources comprises a plurality of light sources and a plurality of refractive optical elements.

21. The illumination system as recited in claim 20, wherein each of the plurality of light sources has an emitting surface and the refractive elements are configured to image at least some of the emitting surfaces onto the entrance end of the integrator.

22. The illumination system as recited in claim 21, wherein the entrance end of the integrator has a first shape and each of the emitting surfaces has a second shape that substantially matches the first shape.

23. The illumination system as recited in claim 20, wherein the plurality of light sources and the plurality of refractive optical elements are configured so that a different refractive optical element is associated with each light source.

24. The illumination system as recited in claim 19, wherein at least one bank of light sources comprises a plurality of light sources and a plurality of refractive elements and wherein the light sources and the refractive elements are configured to form a plurality of aimed-in channels.

25. The illumination system as recited in claim 19, wherein the exit end of the integrator is generally rectangular, the entrance end of the integrator is generally square, and the aperture is generally elliptical.

26. The illumination system as recited in claim 19, further comprising one or more of: a relay optic, a TIR prism, a PBS, a polarizer and a fold mirror, optically connected to the exit end of the integrator.

27. The illumination system as recited in claim 19, further comprising an illumination target optically connected to the exit end of the integrator and relay optics disposed between the illumination target and the exit end of the integrator, wherein the relay optics are configured to image the exit end of the integrator onto the illumination target.

28. The illumination system as recited in claim 19, further comprising an illumination target having a shape and optically connected to the exit end of the integrator, wherein the exit end of the integrator has a shape that substantially matches the shape of the illumination target.

29. The illumination system as recited in claim 19, wherein at least one of the banks of light sources includes light sources of different color shades.

30. The illumination system as recited in claim 19, wherein at least one of the banks of light sources includes a plurality of light sources of a first shade, a plurality of light sources of a second shade and a dichroic combiner for combining light of the first and second shades.

31. The illumination system as recited in claim 30, wherein the light sources of the first shade emit light with a first peak wavelength and the light sources of the second shade emit light with a second peak wavelength, and wherein the first and second peak wavelengths are separated by no more than about 40 nm.

32. The illumination system as recited in claim 19, wherein the banks of light sources produce illumination of different colors, and the illumination system further comprises a dichroic combiner configured for combining the illumination of different colors into the entrance end of the integrator.

33. The illumination system as recited in claim 32, wherein the dichroic combiner comprises a dichroic mirror rotated about a rotation axis substantially parallel to the entrance end of the integrator.

34. The illumination system as recited in claim 33, wherein the long dimensions of the apertures, the rotation axis and the long dimension of the exit end of the integrator are substantially aligned.

35. An illumination system, comprising:
   a light source having a non-radially symmetrical aperture, the aperture having a longer dimension and a shorter dimension, the light source producing illumination with a non-radially symmetrical angular intensity distribution having a larger angular dimension and a smaller angular dimension; and
   an integrator having an entrance end optically connected to the light source, an exit end, and a dimension that experiences a larger increase from the entrance end to the exit end, the integrator being disposed so that the dimension experiencing the larger increase is substantially aligned with the larger angular dimension of the illumination produced by the light source at the entrance end of the integrator.

36. An illumination system, comprising:
   a bank of light sources having a non-radially symmetrical aperture, the aperture having a longer dimension and a shorter dimension, the light source producing illumination with a non-radially symmetrical angular intensity distribution having a larger angular dimension and a smaller angular dimension; and
   an integrator having an entrance end optically connected to the bank of light sources, an exit end and a dimension that experiences a largest increase from the entrance end to the exit end, the integrator being disposed so that the dimension experiencing the larger increase is substantially aligned with the larger angular dimension of the illumination produced by the bank of light sources at the entrance end of the integrator.

* * * * *

UNITED STATES PATENT AND TRADEMARK OFFICE
CERTIFICATE OF CORRECTION

PATENT NO. : 7,101,050 B2
APPLICATION NO. : 10/845673
DATED : September 5, 2006
INVENTOR(S) : Simon Magarill It is certified that error appears in the above-identified patent and that said Letters Patent is hereby corrected as shown below:

Page 2, Column 2, Line 30,
Delete "WO 2002/043076" and insert -- WO 2004/043076 --, therefor.

Page 3, Column 1, Line 1,
Delete "Gerhard" and insert -- Gerard --, therefor.

Page 3, Column 1, Line 6,
Delete "LumiLeds" and insert -- Lumileds --, therefor.

Page 3, Column 2, Line 9,
Delete "Eurpope." and insert -- Europe. --, therefor.

Column 8, line 30,
Delete "PRO9." and insert -- PR09. --, therefor.

Signed and Sealed this

Thirteenth Day of February, 2007

JON W. DUDAS
*Director of the United States Patent and Trademark Office*